United States Patent
Giraudet De Boudemange (10) Patent No.: US 12,050,141 B2
(45) Date of Patent: Jul. 30, 2024

(54) METHOD AND SYSTEM FOR PROCESSING A TEMPERATURE MEASUREMENT SIGNAL DELIVERED BY A SENSOR

(71) Applicant: SAFRAN AIRCRAFT ENGINES, Paris (FR)

(72) Inventor: Benoit Pierre Marie Giraudet De Boudemange, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 393 days.

(21) Appl. No.: 17/049,817

(22) PCT Filed: Apr. 19, 2019

(86) PCT No.: PCT/FR2019/050951
§ 371 (c)(1),
(2) Date: Oct. 22, 2020

(87) PCT Pub. No.: WO2019/207244
PCT Pub. Date: Oct. 31, 2019

(65) Prior Publication Data
US 2021/0048351 A1    Feb. 18, 2021

(30) Foreign Application Priority Data
Apr. 26, 2018  (FR) ...................... 18 53666

(51) Int. Cl.
*G01K 7/42*     (2006.01)
*G01K 13/024*   (2021.01)

(52) U.S. Cl.
CPC ............. *G01K 7/42* (2013.01); *G01K 13/024* (2021.01)

(58) Field of Classification Search
CPC ................................ G01K 13/024; G01K 7/42
See application file for complete search history.

(56) References Cited

U.S. PATENT DOCUMENTS

| 5,080,496 A | 1/1992 | Keim et al. |
| 8,924,190 B2 * | 12/2014 | Djelassi ................... G01K 7/42 |
| | | 703/2 |

(Continued)

FOREIGN PATENT DOCUMENTS

| EP | 2 373 965 A1 | 10/2011 |
| WO | WO 2010/067009 A1 | 6/2010 |
| WO | WO 2010/067011 A1 | 6/2010 |

OTHER PUBLICATIONS

International Search Report issued Aug. 23, 2019 in PCT/FR2019/050951 filed Apr. 19, 2019, 2 pages.

(Continued)

*Primary Examiner* — Natalie Huls
(74) *Attorney, Agent, or Firm* — Oblon, McClelland, Maier & Neustadt, L.L.P.

(57) ABSTRACT

A method for processing a measurement signal T1 of a temperature delivered by a sensor includes: digitally modeling, by a modeled signal T2, the temperature measured by the sensor; and estimating a lag error signal for this sensor, based on the modeled signal T2 and of a signal T3 obtained by filtering the modeled signal, the filtering being parameterized by an estimate of a time constant of the sensor. A temperature signal is obtained by adding to a signal T4, derived from the measurement signal T1, the product of a real parameter K and a signal resulting from the subtraction of the signal T4 from the modeled signal T2. The value of the parameter K applied during the obtaining step varies over time and depends on the value of the estimated lag error signal.

10 Claims, 3 Drawing Sheets

(56) References Cited

U.S. PATENT DOCUMENTS

2011/0238351 A1    9/2011   Djelassi
2011/0246151 A1   10/2011   Djelassi et al.

OTHER PUBLICATIONS

French Preliminary Search Report issued Jan. 30, 2019 in French Application 1853666 filed Apr. 26, 2018, 2 pages.

* cited by examiner

METHOD AND SYSTEM FOR PROCESSING A TEMPERATURE MEASUREMENT SIGNAL DELIVERED BY A SENSOR

BACKGROUND OF THE INVENTION

The invention relates to the general field of measurements, taken using sensors and parameters such as for example the temperature of a fluid.

It more particularly concerns the processing of a measurement signal delivered by a temperature sensor.

The invention thus has a preferred but non-limiting application in the field of aeronautics, and in particular in the field of systems for controlling aircraft engines such as jet engines.

In a known manner, it is necessary, to regulate and adapt the control of a jet engine to the various restrictions of a flight, to measure the temperature of various gas streams passing through the jet engine (these are referred to as flow path temperatures). For this purpose, temperature sensors are used such as probes or thermocouples, positioned in different places of the flow paths of the gas streams.

These temperature sensors generally suffer, when a measurement is taken, from a certain inertia, specific to each sensor, and which in particular depends on the weight (or size) of this sensor. This inertia manifests as a time offset between the moment when the measurement is taken by the sensor and the moment when the value of the signal delivered by the sensor is equal to a value of an ideal response to this measurement. This is known as a "lag effect" of the measurement. Such an effect can cause malfunctions of the jet engine due to inappropriate control thereof, particularly in the event of rapid variations of the temperatures of the gas streams for which the lag effect is particularly apparent.

To palliate this drawback, techniques exist which make it possible to correct the measurement signals delivered by a temperature sensor, by compensating for the lag effect induced by the inertia of this sensor. Such techniques are described for example in the document U.S. Pat. No. 5,080,496 and in the document WO 2010/067009.

In general, these techniques are based firstly on the digital modeling of the temperature measured by the sensor (also known by the name of dynamic measurement model) which offers a good representativeness of the relative deviations during the variation in the temperature, and secondly on a digital model of the inertia of the sensor using a filter parameterized by an estimate of the time constant of this sensor. In a manner known per se, the time constant of a measurement sensor characterizes its response time, i.e. its inertia. On the basis of the digital model of the measured temperature and of the model of the inertia of the sensor it is possible to determine a signal compensating for the lag effect incurred by the inertia of the sensor and to correct the measurement signal delivered by the sensor by adding the compensating signal to it.

The document U.S. Pat. No. 5,080,496 uses, to estimate the time constant of the sensor, a fixed chart indicating an average value of the time constant as a function of a flow rate of the flow of the fluid wherein the sensor is located.

Such a chart is drawn up for predetermined response time profiles and conditions and does not take into account the dispersion of the inertia of one temperature sensor with respect to another one. However, current manufacturing technology does not make it possible to cheaply manufacture temperature sensors for controlling jet engines that comply with a weakly dispersed response time profile. Consequently, it is difficult to obtain charts adapted to the different temperature sensors under consideration. And many problems have been found when the time constants of the sensors integrated into a jet engine differ significantly from the values given by these charts.

Moreover, to obtain an estimate of the time constant from such a chart, it is necessary, beforehand, to estimate the rate of flow of the fluid wherein the sensor is located. The implementation of additional estimators on the jet engine is therefore necessary, which makes the correction of the measurements all the more complex.

To palliate these drawbacks, the document WO2010/067009 proposes to estimate in real time the time constant of the specific sensor under consideration on the basis of the measurement signal delivered by the sensor and of a modeled signal representative of the temperature measured by the sensor. The estimate of the time constant is then used to correct the measurement signal delivered by the sensor. The estimate of the time constant is then used to correct the measurement signal delivered by the sensor (i.e. compensation for the lag effect). The correction made to the measurement signal is thus adapted to the temperature sensor used, whatever its inertia. It is thus possible to use temperature sensors, the respective time constants of which exhibit considerable dispersion, and can be high. This makes it possible to have recourse to temperature sensors that more mechanically solid and less expensive.

SUBJECT AND SUMMARY OF THE INVENTION

The invention proposes an alternative to the techniques for compensating for the lag error of the temperature sensor proposed in the prior art which makes it possible to provide an accurate measurement signal of the temperature measured by the sensor.

More specifically, the invention proposes a method for processing a measurement signal T1 of a temperature delivered by a sensor, comprising:

a step of digital modeling, by a modeled signal T2, of the temperature measured by the sensor; and a step of estimating a lag error signal for this sensor, on the basis of the modeled signal T2 and of a signal T3 obtained by filtering the modeled signal, this filtering being parameterized by an estimate of a time constant (t) of the sensor.

This processing method is noteworthy in that it further comprises a step of obtaining a temperature signal by adding to a signal T4, derived from the measurement signal T1, the product of a real parameter K and a signal resulting from the subtraction of the signal T4 from the modeled signal T2, and in that the value of the parameter K applied during the obtaining step varies over time and depends on the value of the estimated lag error signal, said applied value of the parameter K being taken as equal to 0 when the value of the lag error signal is zero and to 1 when the absolute value of the lag error signal is greater than a first predetermined threshold.

Correlatively, the invention also concerns a system for processing a measurement signal T1 of a temperature delivered by a sensor, comprising:

a digital modeling module, configured to model the temperature measured by the sensor by means of a modeled signal T2; and an estimating module, configured to estimate a lag error signal for this sensor, on the basis of the modeled signal T2 and of a signal T3 obtained by filtering the modeled signal, this filtering being parameterized by an estimate of a time constant of the sensor.

The processing system is noteworthy in that it further comprises an obtaining module, configured to obtain a temperature signal by adding to a signal T4, derived from the measurement signal T1, the product of a real parameter K and a signal resulting from the subtraction of the signal T4 from the modeled signal T2, and in that the value of the parameter K applied by the obtaining module depends on the value of the lag error signal estimated by the estimating module, said value of the parameter K applied by the estimating module being taken as equal to 0 when the value of the lag error signal is zero and to 1 when the absolute value of the lag error signal is greater than a first predetermined threshold.

The term "signal derived from the measurement signal T1" is understood to mean a signal obtained on the basis thereof. It can for example be the measurement signal T1 itself or a measurement signal corrected, for example, to take into account the inertia of the sensor by adding to it an estimate of the lag error.

Moreover, when reference is made to a lag error signal, this does not refer to a physical signal measured, strictly speaking, by a sensor, but to estimated values of the lag error. These values can be determined in particular on the basis of an estimate in real time of the time constant of the temperature probe.

The temperature measured by the sensor is for example a temperature of a fluid flowing in an aircraft engine (e.g. a flow path temperature). The temperature signal obtained owing to the invention can typically be used by a device for regulating or controlling the engine of the aircraft to adapt the control, i.e. the regulation, of the engine to various restrictions. The invention thus has a preferred but non-limiting application in the field of aeronautics.

The approach proposed by the invention is simple and advantageous because it makes use of the properties and assets of each available signal (measurement signal and modeled signal) to formulate an accurate temperature signal:

the measurement signal of the sensor is used when the measured temperature is stabilized and the sensor is operating in a stabilized manner (which corresponds to a stabilization of the temperature over a time interval exceeding the time constant of the sensor), i.e. when a lag effect is no longer observed on the measurement taken by the sensor, and when this signal gives a good representation in absolute value of the measured temperature;

the modeled signal is used when the temperature sensor is on the contrary in a transient phase (corresponding to "rapid" variations in temperature) wherein the inertia of the sensor is felt; in a known manner, digital models generally offer a good representativeness of the relative temperature deviations, which is advantageous for transient phases; and a transition between the two is provided via the parameter K so as to guarantee the accuracy requirements of the temperature signal obtained.

The value of the parameter K which makes it possible to weight the influence of the measurement signal and of the modeled signal in the calculation of the temperature signal, varies over time as a function of the value of the lag error signal. This value of the lag error signal makes it possible to indicate accurately and in real time the different phases of operation of the sensor that govern the moments at which one or the other of the signals (measurement signal and modeled signal) offers a better temperature estimate than the other. The invention does not therefore content itself with detecting variations in temperature, which could for example be identified in the case of a temperature of a fluid flowing in an aircraft engine, by observing the variations in the rotation rating of the engine. But to determine which signal to prefer due to its better representativeness of the temperature that is being estimated, it focuses on the very criterion indicating the current operation of the temperature sensor under consideration (i.e. whether or not there is a lag error on the current measured temperature), and which takes into account the imperfections of this sensor and more particularly its own inertia.

The invention therefore proposes an alternative to the lag error compensation techniques of the prior art which makes it possible, in the event of temperature transients, to fully exploit the accuracy of the digital model with regard to relative temperature deviations. This alternative technique makes it possible, in certain contexts in which it is used, to dispense with the inaccuracies liable to affect certain compensation techniques of the prior art.

The law of variation of the parameter K as a function of the values of the lag error signal can take various forms. This law determines how to pass, following the approach proposed by the invention, from the measurement signal to the modeled signal. It can be determined experimentally.

In a particular embodiment, the value of the parameter K varies linearly between the values 0 and 1 as a function of the value of the lag error signal estimated when the absolute value of the lag error signal is varying between the zero value and the first predetermined threshold.

This embodiment is particularly simple to implement and offers a smooth and continuous transition between the measurement signal and the modeled signal. This has a particular advantage in the field of aeronautics when the temperature signal obtained is used, particularly to control an aircraft engine, the use of a linear law making it possible to avoid disturbing the control, i.e. the regulation, of the engine.

In a particular embodiment related to the aeronautical field, the temperature is a temperature of a fluid flowing through an aircraft engine and, when it is detected simultaneously that the value of the estimated lag error signal is zero and that said temperature is undergoing a succession of rapid variations, the value of the parameter K is kept equal to the value that it had before said detection or is permitted to vary with respect to this value only by a predetermined maximum quantity.

This embodiment advantageously makes it possible to take into account phenomena that can affect an aircraft engine and which manifests as a sequence of rises and falls (i.e. transients) of the fluid temperature. These phenomena are for example due to a succession of rapid accelerations and decelerations of the engine (for example, a rapid deceleration of the engine followed by a rapid acceleration of the engine).

In the presence of such phenomena of one or more successive accelerations and decelerations, the inventors have observed that the lag error signal can cancel itself out even though the temperature has not stabilized (and a fortiori, neither has the temperature sensor). Specifically, in accordance with the invention, the lag error signal is estimated on the basis of a modeled signal and of the modeled signal filtered by a filter taking into account the time constant of the sensor. Given the shape of the filter used to model the inertia of the sensor, the two signals can at a given moment take identical values and lead to the cancellation of the lag error signal while the temperature sensor is not in a stabilized operating phase. Consequently, in such a context, it is not relevant to use the measurement signal coming from the sensor.

In order to avoid this problem, the invention proposes, when such a situation is detected, to keep the current value of the parameter K being used or at least to make sure that it does not vary too much with respect to this current value (and in any case to prevent it from becoming zero). Such a mechanism is also known by the name of "gradient limiter".

The detection of the rapid transients is preferably implemented by taking into account the rotation speed of the engine: more specifically, it is detected that the temperature is undergoing a succession of rapid variations when a variation in a rotation speed of the aircraft engine is greater than a second predetermined threshold.

One could however in a variant envisage other operating parameters of the engine which make it possible to detect rapid transients in the temperature of the fluid of interest.

As mentioned previously, in a particular embodiment, the signal T4 is equal to the measurement signal T1.

The solution proposed by the invention in this embodiment is then relatively simple to implement.

In another embodiment, the signal T4 is obtained by adding to the measurement signal T1 the estimated lag error signal.

In other words, in this embodiment the advantages of the invention are combined with those of the techniques for compensating for the lag error, which makes it possible to improve the robustness of the temperature signal obtained.

Specifically, it should be noted that in a stabilized phase of the sensor, the lag error is zero. Consequently, the "corrected" signal T4 does indeed correspond in this case to the measurement signal T1.

On the other hand, in a transient phase, by using a corrected measurement signal, an interpolation is made via the parameter K between two signals that have one and the same dynamic. This makes it possible to improve the robustness of the approach proposed by the invention and to guarantee a better quality of the temperature signal obtained during the transient phases.

Furthermore, the accuracy of the signal used during the transient phases is improved. Specifically, due to the correction made to the measurement signal, the lag error that affects the measurement signal of the temperature sensor during temperature transients is dispensed with. The use of the corrected measurement therefore makes it possible to gain accuracy during the interpolation phases.

The invention relies on an estimate of the time constant of the temperature sensor to determine, in particular, the lag error signal.

No limitation is attached to the way wherein this time constant is estimated. It is for example possible to use charts as in the prior art.

Preferably, however, the time constant of the temperature sensor is estimated in real time on the basis of the measurement signal T1 and of the modeled signal T2. Here the term "real time" is understood to mean that the time constant of the sensor is estimated at different time points, repeatedly over time (for example at time points spaced apart by a sampling period Te), to take into account its variation as a function of time.

It is possible for example to estimate the time constant as described in the document WO 2010/067009. This makes it possible to have a better estimate of the lag error of the specific sensor that is being used.

For this purpose, for example, the time constant of the sensor can be estimated in real time by implementing the following steps at a given time point:

(a) obtaining a first signal and a second signal respectively, by derivation with respect to time of the measurement signal T1 and the modeled signal T2 respectively;

(b) evaluating a difference between the absolute value of the first signal and the absolute value of the second signal; and (c) estimating the time constant of the sensor on the basis of this difference.

This technique makes it possible to dispense with the imperfections, in terms of absolute estimation of the temperature, of the digital model used to estimate the temperature measured by the sensor. Specifically, due to the use of the derivatives of the measurement signal and of the modeled signal in the invention, it is enough to possess a digital model offering a good representativeness of the relative deviations of the measured temperature.

In a particular embodiment, the different steps of the method for processing a temperature signal according to the invention are determined by computer program instructions.

Consequently, the invention also concerns a computer program on an information medium, this program being able to be implemented in a processing system or more generally in a computer, this program including instructions suitable for implementing the steps of a processing method as described above.

The invention also concerns a computer program on an information medium, this program being able to be implemented in a network device or more generally in a computer, this program including instructions suitable for implementing the steps of a communication method as described above.

Each of these programs can use any programming language, and be in the form of source code, object code, or intermediate code between source code and object code, such as in a partially compiled form, or in any other desirable form.

The invention also concerns an information or recording medium readable by a computer, and including instructions of a computer program as mentioned above.

The information or recording medium can be any entity or device capable of storing the program. For example, the medium can include a storage means, such as a ROM, for example a CD-ROM or a microelectronic circuit ROM, or else a magnetic recording medium, for example a diskette (floppy disk) or a hard disk.

Moreover, the information or recording medium can be a transmissible medium such as an electrical or optical signal, which can be conveyed by an electrical or optical cable, by radio or by other means. The program according to the invention can in particular be downloaded over an Internet-type network.

Alternatively, the information or recording medium can be an integrated circuit into which the program is incorporated, the circuit being suitable for executing or for being used in the execution of the method in question.

As mentioned previously, the invention has a preferred but non-limiting application in the field of aeronautics.

According to another aspect the invention concerns an aircraft engine comprising at least one sensor able to deliver a measurement signal T1 of a temperature and a system for processing the measurement signal T1 delivered by the sensor in accordance with the invention.

In a particular embodiment, the engine further comprises a device for controlling the aircraft engine configured to use the temperature signal obtained by the processing system.

It is also possible to envision, in other embodiments, that the processing method, the processing system and the aircraft engine according to the invention have in combination all or part of the aforementioned features.

BRIEF DESCRIPTION OF THE DRAWINGS

Other features and advantages of the present invention will become apparent from the description given below, with reference to the appended drawings which illustrate an exemplary embodiment thereof devoid of any limitation. In the figures.

DETAILED DESCRIPTION OF AN EMBODIMENT

Figure 1:
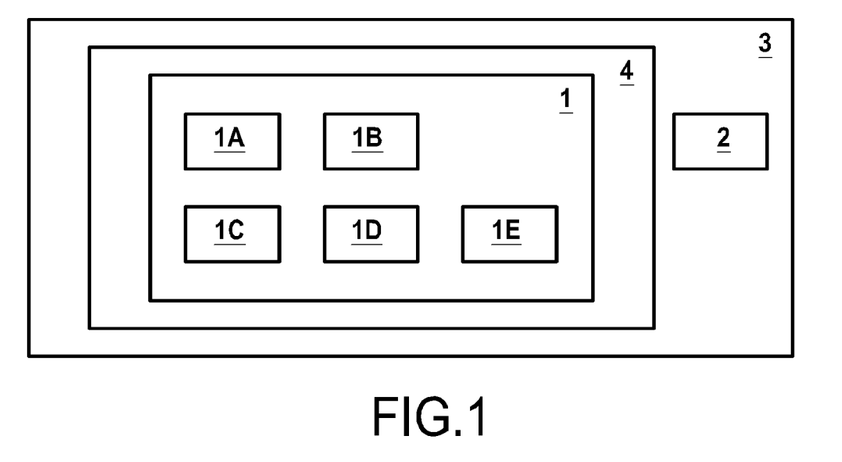
FIG. 1 schematically represents a system for processing a measurement signal of a temperature, in accordance with the invention, in a particular embodiment.

FIG. 1 represents, in a particular embodiment, a processing system 1 in accordance with the invention, and configured to process a measurement signal T1 delivered by a temperature sensor 2 exhibiting thermal inertia.

In the example envisioned in FIG. 1, the processing system 1 equips an aircraft engine 3, and more specifically in a twin spool bypass—jet engine propelling an airplane. The processing system 1 is here incorporated into the full authority control device 4 of the airplane propelled by the jet engine (or coupled to this device), also known by the name FADEC (Full Authority Digital Engine Control), the latter being configured to use, during the controlling and the regulation of the jet engine, the signal resulting from the processing effected by the processing system 1 on the measurement signal T1.

In the example envisioned in FIG. 1, the temperature measured by the temperature sensor 2 is the temperature $T_{25}$ of the air at the intake of the high-pressure compressor of the jet engine 3. Of course, the invention also applies to other temperatures of fluid flowing in the jet engine and which can be measured by means of temperature sensors such as the sensor 2.

The invention can also be implemented in other contexts than the aeronautical context wherein a temperature sensor exhibiting thermal inertia is used.

Figure 2:
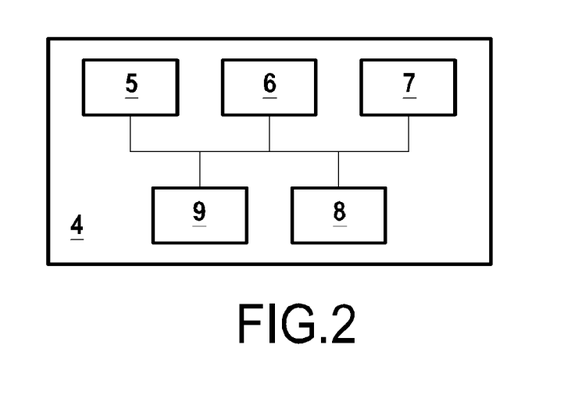
FIG. 2 represents, in schematic form, the hardware architecture of a full authority control device 4 of a jet engine incorporating the processing system of FIG. 1.

In the example envisioned in the figure, the full authority control device 4 of the airplane has the hardware architecture of a computer as schematically represented in FIG. 2.

It particularly comprises a processor 5, a random-access memory 6, a read-only memory 7, a non-volatile flash memory 8, as well as communication means 9 comprising one or more communication interfaces. These communication means 9 in particular allow the full authority control device 4 of the airplane to issue control or regulation commands addressed to various actuators and other equipment of the jet engine 3, and to receive various signals, in particular from sensors equipping the jet engine, such as for example the temperature signal T1 measured by the temperature sensor 2. No limitation is attached to the nature of the communication interfaces implemented between the various items of equipment of the jet engine and the full authority control device 4 of the airplane (e.g. digital buses etc.)

The read-only memory 7 of the full authority control device 4 of the airplane constitutes a recording medium in accordance with the invention, readable by the processor 5 and wherein is recorded a computer program PROG in accordance with the invention including instructions for executing the steps of the processing method according to the invention.

This computer program PROG defines functional (and here software) modules of the full authority control device 4 of the airplane and more precisely of the processing system 1 incorporated into the full authority control device 4 of the airplane. These functional modules are configured to implement the steps of the processing method according to the invention and are based on and/or control the hardware components 5-9 of the full authority control device 4 of the airplane mentioned previously. They here comprise, as illustrated in FIG. 1:

- a digital modeling module 1A, configured to model the temperature $T_{25}$ measured by the sensor 2, by means of a modeled signal T2. This digital modeling module 1A is suitable for modeling the measurement signal that would be delivered by the temperature sensor 2 if the latter were operating without defect related to its time constant or, equally, if the latter had a zero time constant;
- a first estimating module 1B, configured to estimate the time constant of the sensor 2;
- a filtering module 1C, configured to filter the modeled signal T2, the filtering implemented by the filtering module 1C being parameterized by the estimate of the time constant t of the sensor 2 made by the estimating module 1B;
- a second estimating module 1D, configured to estimate a lag error signal denoted $\varepsilon_{lag}$ for the temperature sensor 2, on the basis of the modeled signal T2 supplied by the digital modeling module 1A and of the signal T3 obtained by filtering the modeled signal by the filtering module 1B;
- an obtaining module 1E, configured to obtain a temperature signal denoted in the rest of the text as T, by adding to a signal T4 derived from the measurement signal T1 the product of a real parameter K by a signal resulting from the subtraction of the modeled signal T2 from the signal T4 derived from the measurement signal T1. In accordance with the invention, the value of the parameter K applied by the obtaining module varies over time and depends on the value of the lag error signal $\varepsilon_{lag}$ estimated by the estimating module, as will be further detailed below.

The functions of these different modules and the way wherein they operate are described in more detail below with reference to FIGS. 3 to 6 in different embodiments of the invention.

In a variant, the modules 1A-1E can be implemented by means of electronic hardware components.

In the rest of the description, all the signals under consideration are time-dependent signals sampled at a sample period Te. This sampling period Te is, for example, in the order of 20 to 40 ms. In a known manner, it particularly depends on the dynamic of the measured temperature. It should however be noted that the invention can also be implemented with continuous signals varying as a function of the time t.

Figure 3:
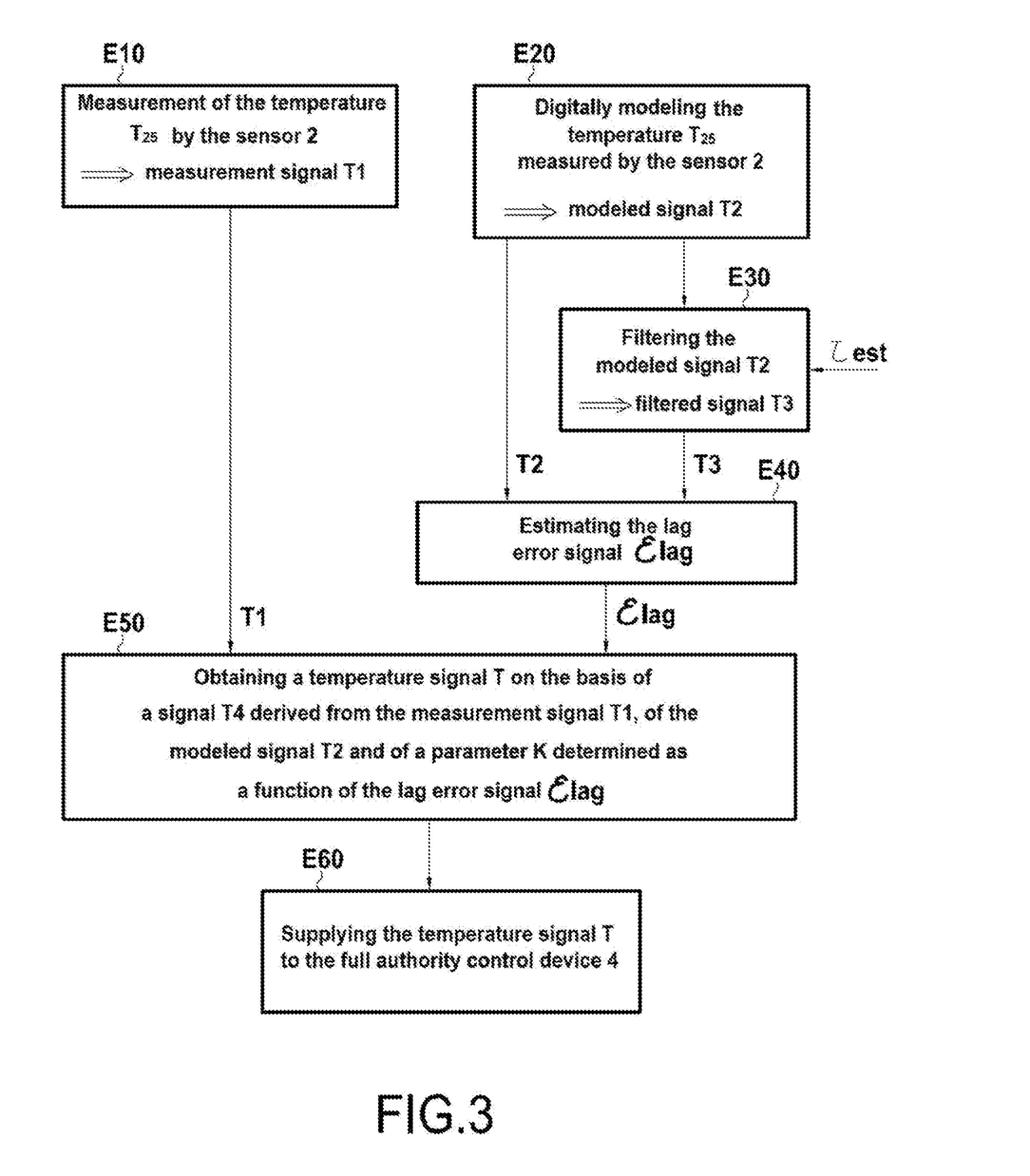
FIG. 3 represents, in the form of a block diagram, the main steps of a method for processing a measurement signal according to the invention, in a particular embodiment wherein it is implemented by the processing system represented in FIG. 1.

FIG. 3 illustrates the main steps of a method according to the invention for processing a measurement signal T1 delivered by the temperature sensor 2, in a particular embodiment wherein it is implemented by the processing system 1. These steps are repeated at each sampling time point t=nTe, where n denotes a positive or zero integer.

It is supposed that the temperature sensor 2 measures at the time point t=nTe, n≥0, the temperature $T_{25}$ at the intake of the high-pressure compressor of the jet engine and supplies, in response to this measurement, a signal T1(nTe) representative of this measurement (step E10).

The processing system 1, via its digital modeling module 1A, moreover generates a modeled signal T2(nTe) digitally modeling the temperature $T_{25}$ measured by the temperature sensor 2. The signal T2 modeled by the digital modeling module 1A is representative of the measurement signal that would be delivered by the temperature sensor 2 if the latter were operating without defect related to its time constant (i.e. no thermal inertia) or, equally, if the latter had a zero time constant.

Figure 4:
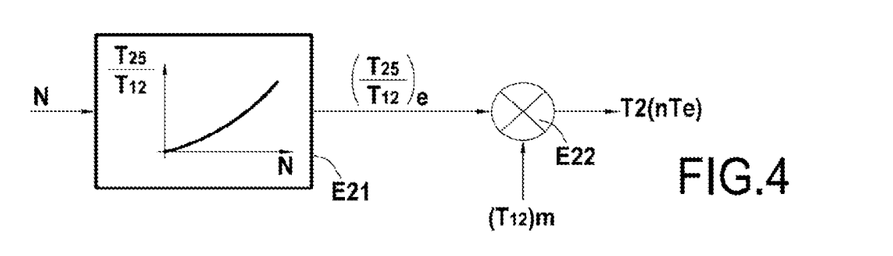
FIG. 4 represents a digital model which can be used by the processing system of FIG. 1.

FIG. 4 represents in schematic form an example of a digital model that can be used by the digital modeling module 1A to generate the modeled signal T2.

According to this example, to generate the modeled signal T2, the digital modeling module 1A uses a measurement of the air temperature of the air at the intake of the fan of the jet engine, denoted $(T_{12})_m$, as well as a measurement denoted $(N)_m$ of the rotation speed N of the jet engine fan, made at the time point nTe. These measurements can be obtained via sensors known per se duly placed in the jet engine. It is for example supposed here that there is no reduction gear between the shaft of the low-pressure compressor and the jet engine fan such that the rotation speed N is equal to the rating N1 of the low-pressure compressor and is supplied by a sensor making it possible to measure this rotation rating.

This example is given only by way of illustration and in a variant, a dedicated sensor can be used to measure the rotation speed N.

More specifically, the digital modeling module 1A estimates, on the basis of the measurement $(N)_m$ of the rotation speed, an adiabatic ratio of temperatures $T_{25}/T_{12}$ (step E21). This ratio is estimated here using a predetermined curve representing the variation in the temperature ratio $T_{25}/T_{12}$ as a function of the rotation speed N of the jet engine fan. Such a curve is known to those skilled in the art and is not further described here.

The estimate $(T_{25}/T_{12})_e$ thus obtained of the ratio $T_{25}/T_{12}$ is then multiplied by the measurement of the temperature $(T_{12})_m$ (step E22). In this way the digital modeling module 1A obtains the modeled signal T2 at the time point nTe.

In a variant, a more elaborate and more accurate digital model of the temperature measured by the sensor 2 can be used by the digital modeling module 1A. Such a model is described in particular in the document U.S. Pat. No. 5,080,496.

With reference to FIG. 3, the modeled signal T2 generated by the digital modeling module 1A is then filtered by the filtering module 1C, generating a filtered signal at the time point nTe denoted T3(nTe) (step E30). In the example envisioned here, the filtering module 1C applies to the signal T2 a first order filter, the transfer function H(p) of which is given by:

$$H(p) = \frac{1}{1 + \tau_{est} p}$$

where p designates a complex variable and $\tau_{est}$ designates an estimate of the time constant τ of the sensor 2 made by the first estimating module 1B of the processing system 1.

The estimate of the time constant τ of the sensor 2 can be made in various ways by the first estimating module 1B.

The first estimating module 1B can for example proceed in a similar or identical manner to that described in the document WO 2010/067009 and estimate a value of the time constant τ of the sensor 2 in real time (in other words at the time point nTe under consideration), on the basis of the measurement signal T1(nTe) and of the modeled signal T2(nTe).

More precisely, to estimate the value $\tau_{est}$ of the time constant of the sensor 2, the first estimating module 1B derives the measurement signal T1 and the measurement signal T2 and obtains the following signals S1 and S2:

$$S2(nTe) = \frac{T2(nTe) - T2((n-1)Te)}{Te}$$

Next, the first estimating module 1B then evaluates a difference signal EPS according to:

$$EPS = |S1(nTe)| - |S2(nTe)|$$

The signal |S1[nTe]| is also compared to a preset s in order to detect a low value of the signal S1, representative of a phase of thermal stability. The preset threshold s will thus be chosen so as to allow this detection. The value of the difference EPS is forced to zero if |S1[nTe]| is less than the threshold s.

Next, the first estimating module 1B uses an estimator of integral corrector type (or integral corrector filter), parameterized by a gain G (G being a real number) to estimate the value of the time constant $\tau_{est}$ at the time point nTe according to:

$$\tau_{est}(nTe) = \tau_{est}((n-1)Te) + G \times EPS$$

where $\tau_{est}[(n-1)Te]$ designates the value of the estimated constant $\tau_{est}$ at the time point (n−1)Te. The choice of the initial value of the time constant $\tau_0$ and the value of the gain G results from a trade-off between the performance of the estimation and the speed of convergence of the adaptive algorithm. It is, for example, possible to choose the initial value of the time constant $\tau_0$ from a chart supplied by the manufacturer of the temperature sensor 2 and such as used in the techniques of the prior art.

In a variant, the first estimating module 1B can use such a chart to determine an average value of the time constant as a function of a rate of flow of the fluid wherein the temperature sensor 2 is located (on the basis of a measurement of this rate of flow supplied by an appropriate sensor of the jet engine), and use this average value as the estimate $\tau_{est}$ of the time constant in the filter applied by the filtering module 1C.

With reference to FIG. 3, the modeled signal T2 generated by the digital modeling module 1A and the filtered signal T3 supplied by the filtering module 1C are then used by the estimating module 1D to estimate a lag error signal $\varepsilon_{lag}$ at the time point nTe for the temperature sensor 2 (step E40). In the embodiment described here, the estimating module 1D estimates the lag error signal $\varepsilon_{lag}$ at the time point nTe by subtracting the signal T3(nTe) from the signal T2(nTe) i.e.:

$$\varepsilon_{lag}(nTe)=T3(nTe)-T2(nTe).$$

The lag error signal $\varepsilon_{lag}$(nTe) determined by the estimating module 1D is then used by the obtaining module 1E of the processing system to obtain a temperature signal denoted T(nTe) intended for the full authority control device 4 of the airplane in order to allow it to regulate and control the jet engine 3 (step E50).

More specifically, the obtaining module 1E obtains the temperature signal at the time point nTe by adding to a signal T4 derived from the measurement signal T1 the product of a real parameter K, greater than or equal to 0, by a signal resulting from the subtraction of the signal T4 derived from the measurement signal T1 from the modeled signal T2, i.e.:

$$T(nTe)=T4(nTe)+K(nTe)[T2(nTe)-T4(nTe)]$$

In a first embodiment, the signal T4 is taken as equal to the measurement signal T1. In other words, the obtaining module 1E determines the signal T(nTe) in the following way:

$$T(nTe)=T1(nTe)+K(nTe)[T2(nTe)-T1(nTe)]$$

In a second embodiment, the signal T4 is obtained by adding to the measurement signal T1 the estimated lag error signal $\varepsilon_{lag}$(nTe). In other words, the signal T4 corresponds to a signal wherein the lag error has been compensated, and:

$$T(nTe)=[T1(nTe)+\varepsilon_{lag}(nTe)]+K(nTe)* [T2(nTe)-[T1(nTe)+\varepsilon_{lag}(nTe)]$$

Figure 5:
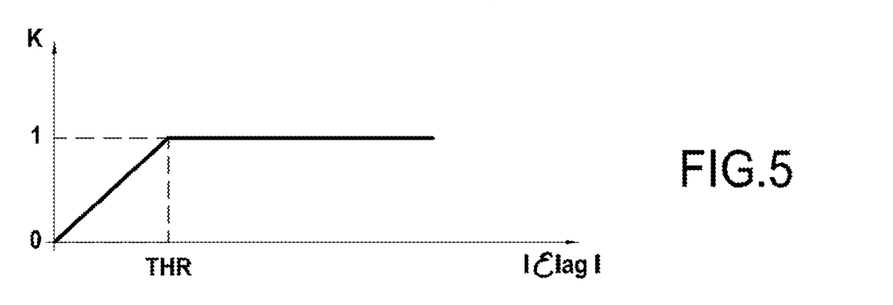
FIG. 5 represents an example of the law of variation of the parameter K used by the processing system of FIG. 1.

In accordance with the invention, the parameter K applied by the obtaining module 1E varies over time and depends on the value of the lag error signal $\varepsilon_{lag}$(nTe) estimated at the time point nTe. In the embodiment considered here, one considers a linear variation of the value of K as a function of the lag error signal, as illustrated in FIG. 5. More specifically:

- the value of K is taken as equal to 0 when the lag error signal is zero (or substantially zero);
- the value of K is taken as equal to 1 when the absolute value of the lag error signal is greater than a predetermined threshold THR, i.e. when $|\varepsilon_{lag}(nTe)|\geq THR$; and
- the value of K varies linearly between 0 and 1 when the absolute value of the lag error signal is between 0 and THR, i.e. when $0<|\varepsilon_{lag}(nTe)|<THR$.

The threshold THR can be determined experimentally, so as to characterize the transient behavior of the temperature sensor 2. Specifically, as mentioned previously, this threshold has the aim of identifying when the temperature sensor 2 is in a transient phase, wherein it is more accurate to consider the signal T2 coming from the digital model rather than the measurement signal T1 coming from the sensor or the measurement signal compensated with the estimated lag error. It is easily possible to determine the threshold THR by making simulations corresponding to relevant scenarios and by iteratively setting the threshold so as to obtain the best representativeness of the measured temperature.

In the embodiment described here, the temperature signal T obtained by the obtaining module 1E is then supplied to the full authority control device 4 of the airplane to regulate and control the jet engine 3 (step E60).

Figure 6:
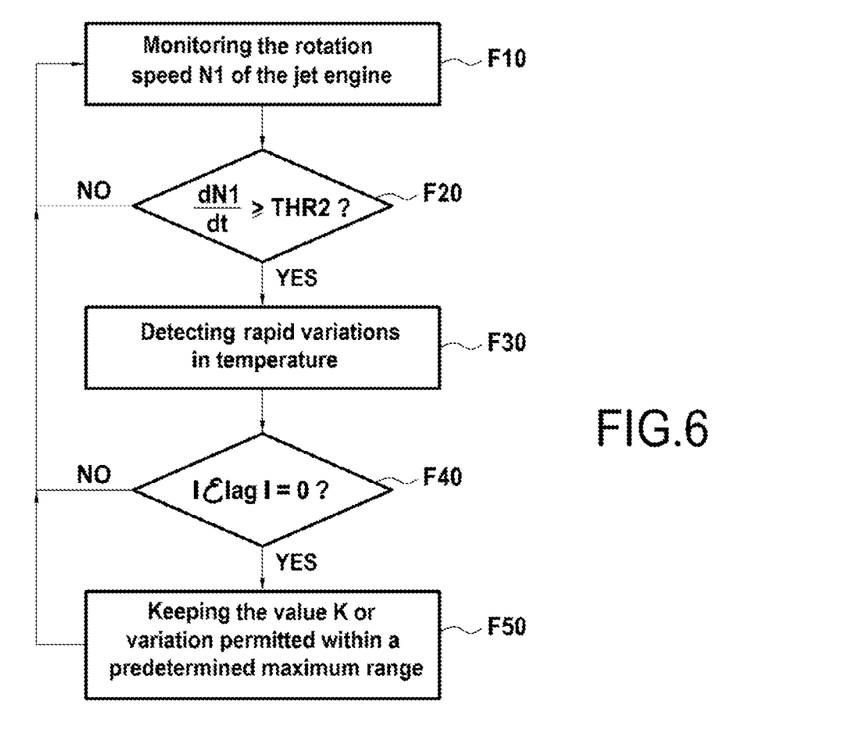
FIG. 6 represents the way wherein the value of the parameter K can be determined in another embodiment of the invention.

FIG. 6 illustrates the way wherein the value of K is determined by the obtaining module 1E as a function of the value of the lag error signal in a second embodiment of the invention.

In this second embodiment, phenomena are taken into account such as a succession of accelerations and decelerations of the jet engine, or adverse conditions, which can manifest as rapid temperature transients (succession of rises and falls in temperature). During such phenomena, due to the abruptness and speed of the rises and falls in temperature, the temperature sensor 2 does not reach a stabilized phase. However, due to the model chosen and the way wherein the lag error is estimated (by subtracting the filtered modeled signal T3 from the modeled signal T2), it may occur that in such a context of rapid temperature transients, the lag error is at a zero time point (corresponding to the "overlap" of the digital model used to generate the modeled signal T2 and the filtered digital model used to generate the filtered modeled signal T3) although the temperature sensor 2 has not stabilized. In such a situation, it is preferable, since the temperature sensor 2 has not stabilized, to give preference to the signal T2 coming from the digital model (or at least to maintain the value of the parameter K applied before the temperature transients) rather than switching to the measurement signal T1 supplied by the temperature sensor 2.

To implement this strategy, the obtaining module 1E is configured, in this second embodiment, to detect if the temperature $T_{25}$ is undergoing a succession of rapid variations (step F10). This detection is carried out by monitoring the variations in the rotation speed N of the jet engine 3. In the example mentioned previously of a jet engine not comprising any reduction gear between the low-pressure compressor and the fan, this detection is made by monitoring the variations in the rotation speed N1 of the low-pressure compressor of the jet engine 3 (i.e. N=N1 in this example).

For this purpose, the obtaining module 1E uses a measurement of the rotation speed N1 at the time point nTe, acquired by a speed sensor known per se and duly positioned in the jet engine 3, and obtains a derivative dN1(nTe)/dTe of this measurement at the time point nTe, for example in the following way:

$$dN1(nTe)/dTe = \frac{N1(nTe) - N1((n-1)Te)}{Te}$$

Next, it compares the value of the derivative dN1(nTe)/dTe obtained with respect to a predetermined threshold THR2 (test step F20). As mentioned previously for the threshold THR, the threshold THR2 can be determined experimentally by making different simulations and by iteratively setting during these simulations the value of the threshold THR2 to obtain the best representativeness of the measured temperature.

If the value of the derivative dN1(nTe)/dTe is greater than the threshold THR2, the obtaining module 1E considers (i.e. detects) that the temperature $T_{25}$ is undergoing a succession of rapid variations (step F30).

If simultaneously, i.e. for the same time point nTe, it detects that the lag error signal is zero during the obtaining step E50 ("yes" answer to the test step F40), then to calculate the temperature signal T(nTe), instead of applying a parameter K(nTe) of zero value as indicated by the law of variation of K previously described with reference to FIGS. 3 and 5, the obtaining module 1E keeps the value of the parameter K equal to the value that this parameter had before the time point nTe at which it was detected that dN1(nTe)/dTe was greater than the threshold THR2 (in other words K(nTe)=K ((n−1)Te instead of K(nTe)=0 as indicated by the variation law illustrated in FIG. 5) (step F50).

In a variant, the value of the parameter K used at the time point nTe can be modified by the obtaining module 1E, but is only permitted to vary with respect to the value it had before the simultaneous detection of the rapid variations of the temperature $T_{25}$ and of a zero lag error signal by a predetermined maximum quantity. This maximum quantity can be determined experimentally, as described previously for the thresholds THR and THR2.

In other words, the obtaining module 1E uses a gradient limiter to restrict the value of K to not becoming zero and not varying too greatly during this period of rapid transitions of the measured temperature.

It is noted that the keeping of the value of the parameter K, or the gradient limiter, only occurs when the obtaining module 1E detects a period of rapid transients of the measured temperature simultaneously with a cancellation of the lag error signal. In the other scenarios, the variation law illustrated in FIG. 5 is applied.

The invention, whatever the embodiment envisioned, thus makes it possible to obtain an accurate temperature signal representative of the temperature T25 measured by the temperature sensor 2 and able to be used for the control and regulation of the jet engine.

The invention claimed is:

1. A method for processing a measurement signal T1 of a temperature of a fluid flowing through an aircraft engine delivered by a sensor provided in the aircraft engine, comprising:
    digital modeling, by a modeled signal T2, of the temperature measured by the sensor;
    estimating a lag error signal for the sensor, based on the modeled signal T2 and a signal T3 obtained by filtering the modeled signal T2, the filtering being parameterized by an estimate of a time constant of the sensor;
    obtaining a temperature signal T, by adding to a signal T4, derived from the measurement signal T1, a product of a real parameter K and a signal resulting from subtracting the signal T4 from the modeled signal T2, such that the temperature signal T=T4+K(T2−T4) so as to use the measurement signal of the sensor when the measured temperature is stabilized and the sensor is operating in a stabilized manner to obtain the temperature signal T, to use the modeled signal when the sensor is in a transient phase and an inertia of the sensor is felt to obtain the temperature signal T, and the real parameter provides a transition between the two uses; and
    controlling the aircraft engine based on the temperature signal,
    wherein a value of the parameter K applied during the obtaining varies over time and depends on a value of the estimated lag error signal, said applied value of the parameter K being taken as equal to 0 when the value of the estimated lag error signal is zero and equal to 1 when an absolute value of the estimated lag error signal is greater than a first predetermined threshold.

2. The processing method as claimed in claim 1, wherein the value of the parameter K varies linearly between the values 0 and 1 as a function of the value of the estimated lag error signal when the absolute value of the lag error signal varies between zero and the first predetermined threshold.

3. The processing method as claimed in claim 1,
    wherein, when the value of the estimated lag error signal is zero and said temperature is undergoing a succession of rapid variations are detected simultaneously, the value of the parameter K is kept equal to the value that the value of the parameter K had before said detection or is permitted to vary with respect to the value of the parameter K only by a predetermined maximum quantity.

4. The processing method as claimed in claim 3, further comprising detecting that the temperature is undergoing a succession of rapid variations when a variation in a rotation speed of the aircraft engine is greater than a second predetermined threshold.

5. The processing method as claimed in claim 1, wherein the signal T4 is equal to the measurement signal T1.

6. The processing method as claimed in claim 1, wherein the signal T4 is obtained by adding to the measurement signal T1 the estimated lag error signal.

7. The processing method as claimed in claim 1, wherein the time constant of the sensor is estimated in real time based on the measurement signal T1 and the modeled signal T2.

8. The processing method as claimed in claim 7, wherein the time constant of the sensor is estimated as a function of time by:
    (a) obtaining a first signal and a second signal respectively, by derivation with respect to time of the measurement signal T1 and the modeled signal T2 respectively;
    (b) evaluating a difference between an absolute value of the first signal and an absolute value of the second signal; and
    (c) estimating the time constant of the sensor on the basis of the difference.

9. An aircraft engine comprising:
    a sensor able to deliver a measurement signal T1 of a temperature; and
    a processing system for processing the measurement signal T1 of the temperature delivered by the sensor, the processing system comprising:
    a digital modeling module, configured to model the temperature measured by the sensor by a modeled signal T2;
    an estimating module, configured to estimate a lag error signal for the sensor, based on the modeled signal T2 and a signal T3 obtained by filtering the modeled signal T2, the filtering being parameterized by an estimate of a time constant of the sensor; and
    an obtaining module, configured to obtain a temperature signal T by adding to a signal T4, derived from the measurement signal T1, a product of a real parameter K and a signal resulting from subtracting the signal T4 from the modeled signal T2 such that the temperature signal T=T4+K(T2−T4) so as to use the measurement signal of the sensor when the measured temperature is stabilized and the sensor is operating in a stabilized manner to obtain the temperature signal T, to use the modeled signal when the sensor is in a transient phase and an inertia of the sensor is felt to obtain the temperature signal T, and the real parameter provides a transition between the two uses,
    wherein a value of the parameter K applied by the obtaining module depends on a value of the lag error signal estimated by the estimating module, said value of the parameter K applied by the estimating module being taken as equal to 0 when the value of the lag error signal is zero and equal to 1 when an absolute value of the lag error signal is greater than a first predetermined threshold.

10. The aircraft engine as claimed in claim 9, further comprising a device for controlling the aircraft engine configured to use the temperature signal obtained by the processing system.

\* \* \* \* \*